(12) United States Patent
Yamada

(10) Patent No.: US 7,766,587 B2
(45) Date of Patent: Aug. 3, 2010

(54) SMALL RADIUS END MILL TOOL

(75) Inventor: Fumiaki Yamada, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/338,995

(22) Filed: Dec. 18, 2008

(65) Prior Publication Data

US 2009/0110495 A1    Apr. 30, 2009

Related U.S. Application Data

(63) Continuation of application No. 11/610,611, filed on Dec. 14, 2006, now Pat. No. 7,473,059.

(30) Foreign Application Priority Data

Dec. 14, 2005    (JP)    ............................. 2005-360613

(51) Int. Cl.
  *B23C 5/02*    (2006.01)
  *B23C 3/28*    (2006.01)
(52) U.S. Cl. .......................... 409/232; 407/42; 407/36; 407/34; 407/65; 407/118
(58) Field of Classification Search ................. 409/232, 409/234, 138, 143; 407/65, 64, 30, 32, 33, 407/34, 40, 42, 46, 47, 118, 36, 37, 38, 53–54; 408/227, 231, 233
See application file for complete search history.

(56) References Cited

U.S. PATENT DOCUMENTS

| | | | | |
|---|---|---|---|---|
| 1,935,555 A | * | 11/1933 | Gorton | 407/53 |
| 3,303,862 A | * | 2/1967 | Westenberger | 407/34 |
| 3,542,528 A | * | 11/1970 | Bech | 407/37 |
| 5,397,204 A | * | 3/1995 | Grenier et al. | 409/234 |
| 5,893,683 A | * | 4/1999 | Johnson | 407/42 |
| 6,095,723 A | * | 8/2000 | Reynolds et al. | 407/54 |
| 7,094,009 B2 | * | 8/2006 | Chao et al. | 409/50 |
| 7,473,059 B2 | * | 1/2009 | Yamada | 409/232 |

FOREIGN PATENT DOCUMENTS

DE           3209879 A1 * 9/1983
JP     2003-181714 A  *  7/2003

* cited by examiner

*Primary Examiner*—Erica E Cadugan
(74) *Attorney, Agent, or Firm*—Ido Tuchman; Kenneth R. Corsello

(57) ABSTRACT

An end mill including a shank having one end gripped by a chuck which is rotatable about a predetermined rotation axis, and a blade body attached to the other end of the shank and rotatable together with the shank. The blade body has a shape in which the area of a cross section in a plane perpendicular to the rotation axis decreases as the distance from the shank increases, and includes a linear cutting edge parallel to, and at a certain distance from, the rotation axis. An end cutting edge adjoining the cutting edge in the longitudinal direction thereof may be provided. The blade body includes, for example, a rake-face-side surface including a rake face and adjoining the flank-side surface in two portions, and a linear cutting edge formed at one of the positions at which the flank-side surface and the rake-face-side surface come in contact with each other.

15 Claims, 12 Drawing Sheets

SMALL RADIUS END MILL TOOL

CROSS-REFERENCE TO RELATED APPLICATIONS

This application is a continuation of U.S. patent application Ser. No. 11/610,611, now U.S. Pat. No. 7,473,059, filed on Dec. 14, 2006, which claims priority under 35 U.S.C. §119 to Japanese Patent Application No. 2005-360613 filed Dec. 14, 2005, the entire text of which is specifically incorporated by reference herein.

BACKGROUND OF THE INVENTION

The present invention relates to an end mill and a method of manufacturing the same. More specifically, the present invention relates to an end mill which is attached to a spindle of a milling apparatus or the like to be used in the case where a workpiece is machined to form a fine groove, and relates to a method of manufacturing the same.

In optoelectronics devices, optical components, such as diffraction gratings and microlens arrays, which have fine structures, are used. In this kind of components, forming finer structures is demanded according to technical trends such as the reduction of wavelengths of light sources and the miniaturization of devices. Moreover, the commercialization of optical integrated circuits in which optical waveguides formed on a substrate are combined is in progress.

On the other hand, in medical and biochemical fields and the like, instruments having structures for dealing with very small amounts of samples are also used. Such instruments include biochips, microneedle arrays, and chemical micro reactors. In this kind of instruments, too, fine structures are demanded which have higher accuracy and smoother finished quality.

The entire sizes of products having such a fine structure are approximately several mm to several tens of mm. On the other hand, for the form accuracy and the surface roughness of the structure, accuracy of a submicron order to approximately several tens of pm is demanded. As a method of processing a fine shape on the order of microns, lithography technology is known in which semiconductor manufacturing technology is applied. It should be noted, however, that since molding methods in this kind of technology utilize chemical reactions, the controllability of a processing depth and that of the molding of details such as an edge are low.

Moreover, in chemical processing methods, the number of steps for completing a product is large, and each step takes a certain period of time. In addition, since a particular chemical reaction is utilized, there are restrictions on a material as an object of processing. Accordingly, it is difficult to mold, for example, lithium niobate which is a material for an optical waveguide, a germanium lens used in an infrared optical system, or the like by a chemical processing method.

Other than the above-described chemical processing methods, Japanese Patent Laid-open Official Gazette No. 2002-283174 (Patent Document 1) discloses a high-accuracy machine tool which can perform fine machining. This makes it possible to control the position of a processing tool with accuracy on the order of microns. Moreover, Japanese Patent Laid-open Official Gazette No. 2004-148471 (Patent Document 2) discloses the structure of an end mill which can be attached to the above-described machine tool to perform micromachining. This makes it possible to form a fine structure using a tool having a diamond tip. Furthermore, Japanese Patent Laid-open Official Gazette No. 2004-345031 (Patent Document 3) discloses an end mill for micromachining which has other structure. This makes it possible to form a fine structure even in a high-hardness material such as metal.

However, since an object to be machined by the end mill described in Patent Document 2 is a resin material, the bending strength of a cutting edge portion of the end mill is low. Accordingly, there is a problem that breakage easily occurs if a metal material which is formed into, for example, a die is machined using this end mill.

Moreover, on the end mill described in Patent Document 3, there is a structural restriction that the crystalline orientation thereof is specified. For example, in the case where a groove is formed in a workpiece, it is easy to form a groove having a V-shaped cross section in which the opening side is wider, but, on the other hand, it is difficult to form a machined surface parallel to the rotation axis of the end mill.

BRIEF SUMMARY OF THE INVENTION

In order to solve the above-described problems, as a first aspect of the present invention, provided is an end mill including: a shank having one end gripped by a spindle and being rotatable about a predetermined rotation axis; and a blade body which is bonded to other end of the shank and rotatable together with the shank. The blade body has a shape in which an area of a cross section in a plane perpendicular to the rotation axis decreases as distance from the shank increases, and the blade body includes a linear cutting edge parallel to the rotation axis at a certain distance from the rotation axis. Since this end mill has the cutting edge parallel to the rotation axis, a rectangular groove can be machined which has side walls perpendicular to a surface of an object of machining. Moreover, since the blade body has the area of a cross section which increases as the distance from the shank decreases, reaction forces from the cutting edge during machining are dispersed over the entire blade body, and the occurrence of stress concentration in a particular portion can be prevented. Accordingly, high strength against breakage is provided, and high-hardness materials such as tooling materials can also be machined.

In the above-described end mill, the blade body may include an end cutting edge adjoining the cutting edge in a longitudinal direction of the cutting edge. This makes it possible to efficiently stick the end mill in an object of machining from a surface thereof.

In the above-described end mill, the end cutting edge may be formed at a right angle to the cutting edge, and may be provided to be displaced from the rotation axis to one side. This reduces the amount of machining by each portion of the end cutting edge, and machining is performed by the highly durable end cutting edge. Accordingly, the bottom surface of a groove, a hole, or the like formed can be finished to be smooth.

In the above-described end mill, the end cutting edge may be obliquely provided to be more protruded as distance from the cutting edge decreases. This increases the amount of machining by the tip end of the end cutting edge, and high-speed machining can be performed. Moreover, since the cutting edge can be provided to be closer to the rotation axis, an end mill having a narrower machining width can be formed.

In the above-described end mill, the blade body may include a flank-side surface including a flank and having a shape which is part of a curved surface of a cone, and a rake-face-side surface including a rake face and adjoining the flank-side surface in two portions; and the cutting edge may be formed in one of the two portions in which the flank-side surface and the rake-face-side surface come in contact with each other. This makes the blade body supporting the cutting edge have a shape in which the cross-sectional shape changes continuously, and reaction forces which the cutting edge is subjected to during machining are three-dimensionally dispersed over the entire cutting edge. Accordingly, the occurrence of stress concentration in a particular portion of the cutting edge can be prevented.

In the above-described end mill, a central axis of the cone and the rotation axis of the shank may intersect each other. This enables the cutting edge formed on the curved surface of the cone to be placed parallel to the rotation axis of the shank.

In the above-described end mill, an extension line of the rotation axis of the shank may pass through a position closer to the flank-side surface than the end cutting edge, at the tip end of the blade body. This enables the cutting edge to rotate fast to improve machining speed, and makes the finished quality of a machined surface smooth.

In the above-described end mill, the cone may be a circular cone, and the rake-face-side surface may be parallel to a central axis of the circular cone. This makes it possible to easily form the blade body by grinding.

In the above-described end mill, the rake-face-side surface may be part of any one of a circular conical surface and a cylindrical surface. This makes it possible to form the rake-face-side surface with high accuracy using a rotary grinding tool.

In the above-described end mill, the rake-face-side surface may be formed by grinding a flat surface using a tool having any one of a conical grinding surface and a cylindrical grinding surface. This enables the cutting edge to be finished with sharpness.

In the above-described end mill, the other end of the shank may have an end face, which tilts to the rotation axis, and an attachment hole formed perpendicularly to the end face, and the blade body may be supported by one end of a tip, the other end of which is inserted in the attachment hole. This makes it possible to form an end mill in which the tip and a component placed farther from the shank than the tip can be changed. Accordingly, the end mill can be used economically.

In the above-described end mill, the attachment hole may be a straight hole formed by perpendicularly sticking a tool in the end face after forming the end face tilting to the rotation axis. This makes it possible to form the attachment hole with high accuracy. Accordingly, the position accuracy of the tip and the blade body attached thereto is also improved.

In the above-described end mill, the shank may have a threaded hole formed perpendicularly to the attachment hole from a curved surface thereof, and the tip may be fixed in place by a screw screwed in the threaded hole. This facilitates attaching and changing the tip and the blade body.

In the above-described end mill, the tip may have a bonding surface bonded to an entire bottom surface of the blade body. This enables the blade body to be supported and fixed in place over a wide area. Accordingly, the durability of the end mill is improved.

In the above-described end mill, the tip may have a bonding surface bonded to the blade body, in which the bonding surface includes a bonding surface bonded to part of the rake-face-side surface of the blade body. This enables the blade body to be supported and fixed in place over a wide area. In addition, the practical bending strength of the blade body can be improved by attaching the tip to part of the blade body.

Moreover, as a second aspect of the present invention, provided is a method of manufacturing an end mill including a shank and any one of a blade body and a tip attached to one end of the shank in a state in which a central axis thereof in a longitudinal direction tilts to a rotation axis of the shank. The method includes the steps of: machining the one end of the shank to form a tilted end face having a tilt angle to the rotation axis, in which the tilt angle corresponds to an angle complementary to the tilt angle of the central axis to the rotation axis; perpendicularly sticking a tool in the tilted end face to form an attachment hole in which any one of the blade body and the tip is inserted; and fixing in place any one of the tip and an opposite end portion of the blade body from a cutting edge in a state in which any one of the tip and the opposite end portion of the blade body is inserted in the attachment hole. This prevents a tool for forming the attachment hole from shaking when the tool is stuck. Accordingly, the attachment hole having an appropriate angle to the rotation axis of the shank can be formed with high accuracy. Also, the tip or the blade body inserted in the attachment hole enables the cutting edge to be reliably held by the shank at an appropriate angle.

The above-described method of manufacturing an end mill may further include the steps of: forming a threaded hole threaded inside in the shank perpendicularly to the attachment hole; and fixing in place any one of the blade body and the tip inserted in the attachment hole by pressing any one of the blade body and the tip against an inner surface of the attachment hole using a screw screwed in the threaded hole. This enables the blade body or the tip to be reliably fixed in place by a simple operation. Also, by loosening the screw, the position of the cutting edge can be readjusted, and a deteriorated cutting edge can be easily changed.

Furthermore, as a third aspect of the present invention, provided is a milling apparatus including: a spindle head for supporting a rotatable spindle; and an end mill gripped by the spindle and rotatable about a predetermined rotation axis. The end mill includes: a shank having one end gripped by the spindle; and a blade body having a shape in which an area of a cross section in a plane perpendicular to the rotation axis decreases as distance from the shank increases, including a linear cutting edge parallel to the rotation axis at a certain distance from the rotation axis, and being bonded to the other end of the shank to be rotatable together with the shank. This makes it possible to form a fine structure in a high-hardness material such as a tooling material by machining using the cutting edge of the end mill having the above-described features. Accordingly, for example, a die suitable for the mass production of an optical waveguide, a micro reactor, or the like can be prepared speedily and easily.

It should be noted that the above-described summary of the invention does not list all features necessary for the present invention and that subcombinations of these features can also be included in the present invention.

BRIEF DESCRIPTION OF THE DRAWINGS

For more complete understanding of the present invention and the advantage thereof, reference is now made to the following description taken in conjunction with the accompanying drawings.

DETAILED DESCRIPTION OF THE PREFERRED EMBODIMENTS

Hereinafter, the present invention will be described using embodiments of the invention. However, the embodiments below are not intended to limit the invention commensurate with the scope of the claims, and all of a combination of features described in the embodiments are not necessarily indispensable for solving means of the invention.

Figure 1:
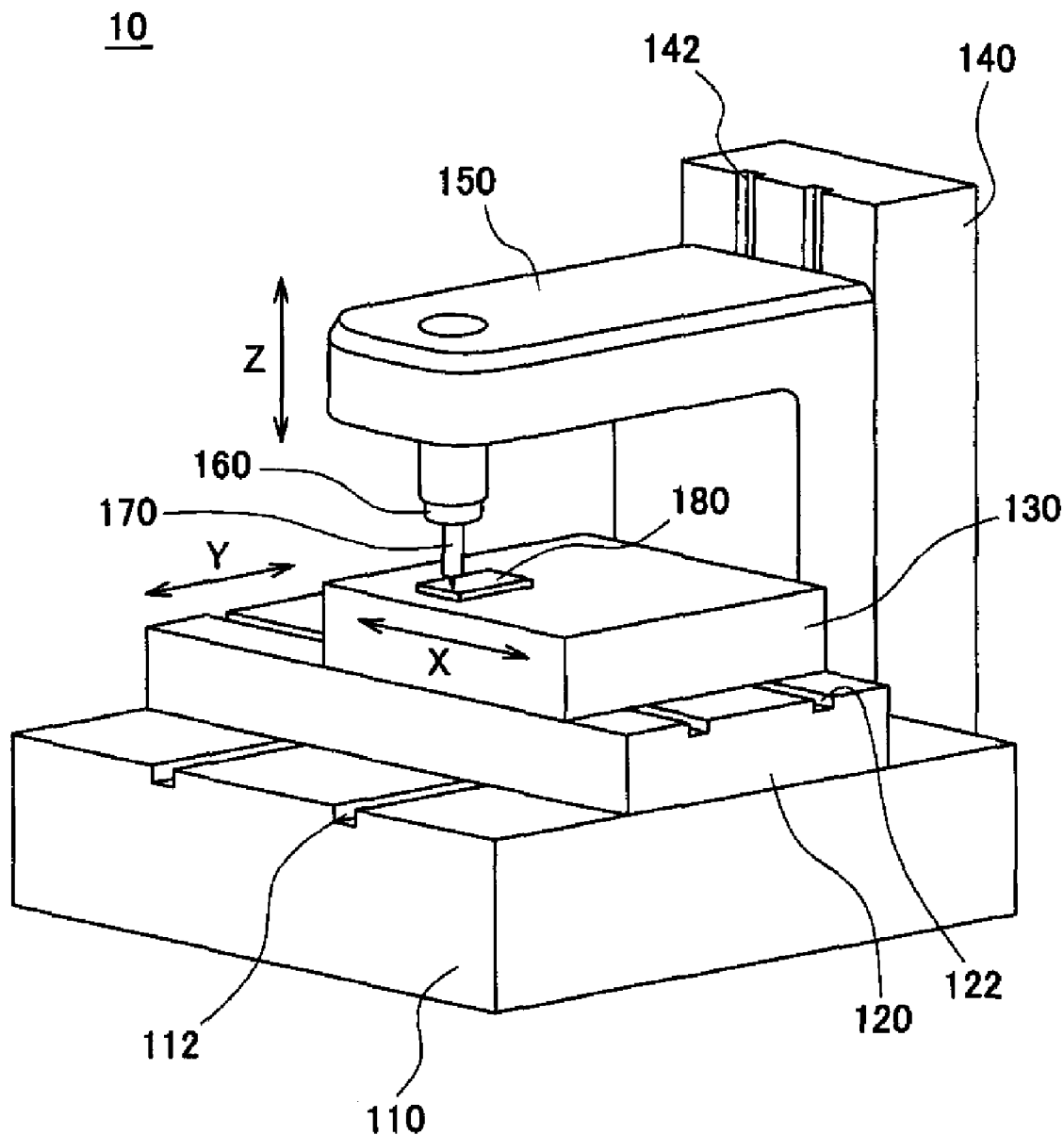
FIG. 1 is a view showing the schematic shape of a milling apparatus 10 which is used for machining by attaching an end mill 170 thereto.

FIG. 1 is a perspective view showing the overall shape of a milling apparatus 10 which can be used for micromachining. As shown in FIG. 1, this milling apparatus 10 includes a moving table 120 and a machining table 130 which are stacked on a base 110 in order, a supporting post 140 which stands upright behind the base 110, and a spindle head 150 supported by the front surface of the supporting post 140.

In the upper surface of the base 110, a pair of guide grooves 112 are formed which extend in the back-and-forth direction indicated by arrow Y in FIG. 1. On the lower surface of the moving table 120, protrusions, which cannot be seen in FIG. 1, are formed to fit into the guide grooves 112. Accordingly, the moving table 120 can move in the back-and-forth direction.

In the upper surface of the moving table 120, a pair of guide grooves 122 are formed which extend in the width direction of the base 110, the direction being indicated by arrow X in FIG. 1. On the lower surface of the machining table 130, protrusions, which cannot be seen in FIG. 1, are formed to fit into the guide grooves 122. Accordingly, the machining table 130 can move in the side-to-side direction.

By combining the movement of the moving table 120 and that of the machining table 130, the machining table 130 can be moved to an arbitrary position within a certain range. It should be noted that though not shown, feed screws for controlling the amount of movement of, and for limiting unnecessary movement of, the moving table 120 or the machining table 130 are attached between the base 110 and the moving table 120 and between the moving table 120 and the machining table 130, respectively. Moreover, in the milling apparatus 10 intended to perform accurate machining, means for biasing the moving table 120 or the machining table 130 in a certain direction is provided in order to eliminate the backlash of each feed screw.

On the other hand, in the front surface of the supporting post 140, a pair of guide grooves 142 are also formed which extend in the vertical direction indicated by arrow Z in FIG. 1. On the back surface of the spindle head 150, protrusions, which cannot be seen in FIG. 1, are formed to fit into the guide grooves 142. Accordingly, the spindle head 150 can move along the supporting post 140 in the up-and-down direction. It should be noted that though also not shown, a feed screw for controlling the amount of movement of the spindle head 150 and limiting unnecessary movement of the spindle head 150 is attached between the supporting post 140 and the spindle head 150. In addition, means for biasing the spindle head 150 in a certain direction is provided in order to eliminate the backlash of this feed screw.

The spindle head 150 extends forward, and, from the vicinity of the front end thereof, a spindle provided with a chuck 160 extends down toward the machining table 130. The chuck 160 is rotationally driven about a vertical rotation axis together with the spindle by driving means not shown. The chuck 160 can grip an end mill 170, and the gripped end mill 170 rotates together with the chuck 160.

In the milling apparatus 10, a workpiece 180 as an object of machining is fixed to the upper surface of the machining table 130 by fixing means not shown. The spindle head 150 moves down toward the workpiece 180 while rotating the end mill 170 gripped by the chuck 160, and finally sticks the lower end of the end mill 170 in the workpiece 180. Moreover, by moving the machining table 130 or the moving table 120 in this state, a hole or a groove having a desired shape is formed in the upper surface of the workpiece 180. Furthermore, by slightly moving the spindle head 150 up and down in addition to the movement of the moving table 120 and the machining table 130, the depth of a groove formed in the workpiece 180 can also be changed. It should be noted that these operations can also be automated by numerically controlling the movement of the moving table 120 and the machining table 130 and the upward and downward movement of the spindle head 150.

Figure 2:
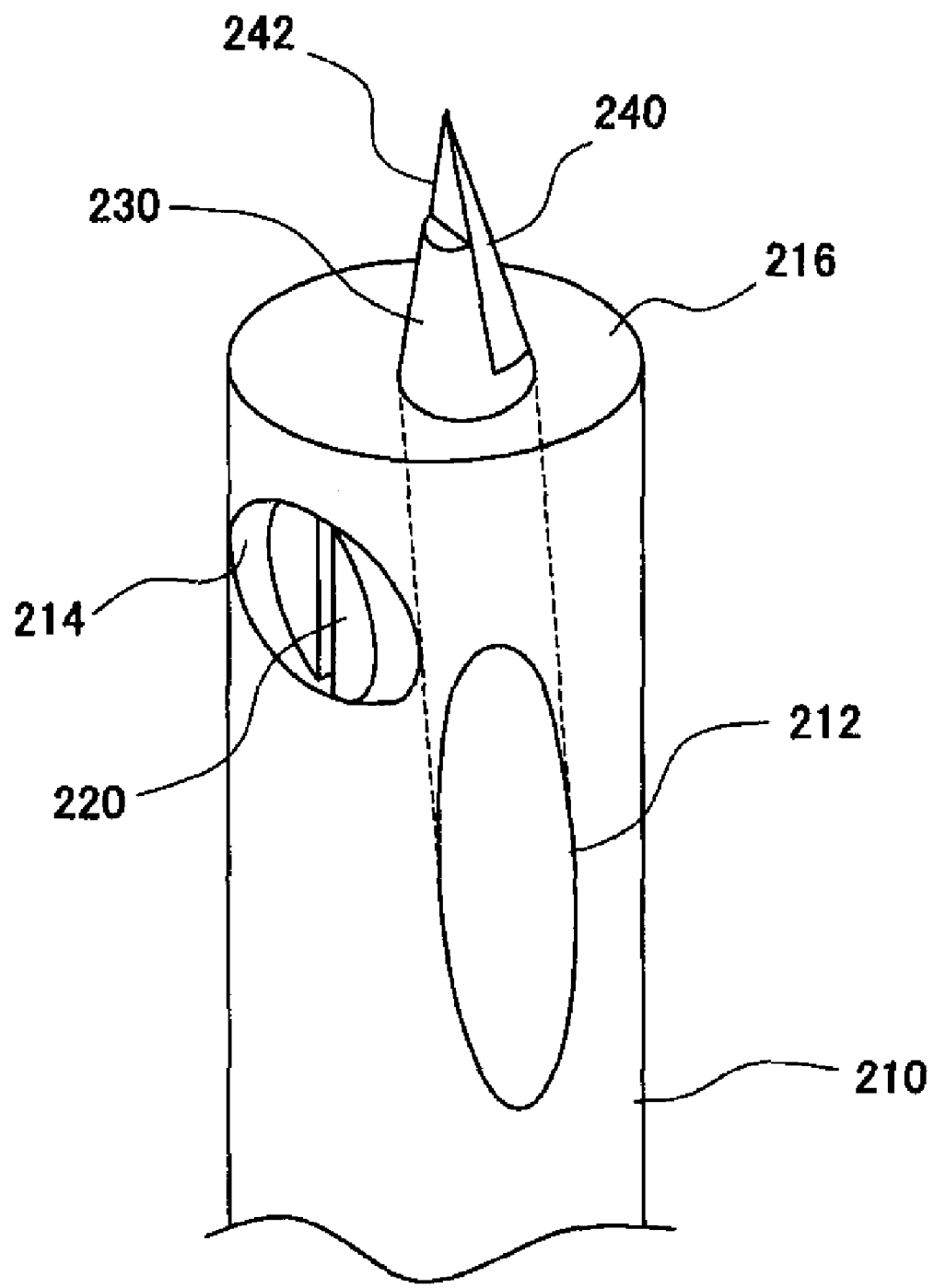
FIG. 2 is a perspective view showing a layout in the vicinity of the tip end of the end mill 170 having a blade body 240 attached thereto.

FIG. 2 is a perspective view in which the end mill 170 used in a state of being attached to the milling apparatus 10 is shown alone upside down and in which the vicinity of the tip end (lower end in FIG. 1) of the end mill 170 is schematically shown. As shown in FIG. 2, this end mill 170 includes a shank 210 gripped by the chuck 160 of the milling apparatus 10 at the lower end in FIG. 1, a tip 230 attached to an end face 216 of the shank 210, and a blade body 240 bonded to the tip end of the tip 230. The end mill 170 further includes a screw 220 for fixing the tip 230 to the shank 210 by a method such as described later. It should be noted that the tip 230 is extended to the inside of the shank 210 and that this extended portion is inserted in an attachment hole 212 formed in the shank 210.

Figure 3:
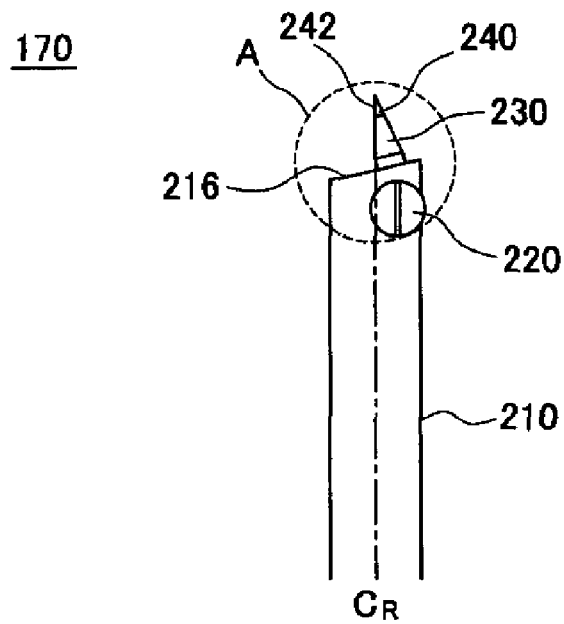
FIG. 3 is a side view of the end mill 170 shown in FIG. 2.

FIG. 3 is a side view showing the end mill 170 alone as seen from the direction in which the screw is screwed therein in a state in which the end mill 170 shown in FIG. 1 is turned upside down and in which the central axis of the shank 210 is placed upright. As shown in FIG. 3, the blade body 240 is attached to the end face 216 of the shank 210 at a position displaced from the rotation axis $C_R$ of the shank 210 to the right in FIG. 3. Moreover, the blade body 240 has a tapered outside shape which becomes narrower as the distance from the tip end thereof decreases. It should be noted, however, that the blade body 240 is seen as a triangle in FIG. 3, which is a side view.

Figure 4:
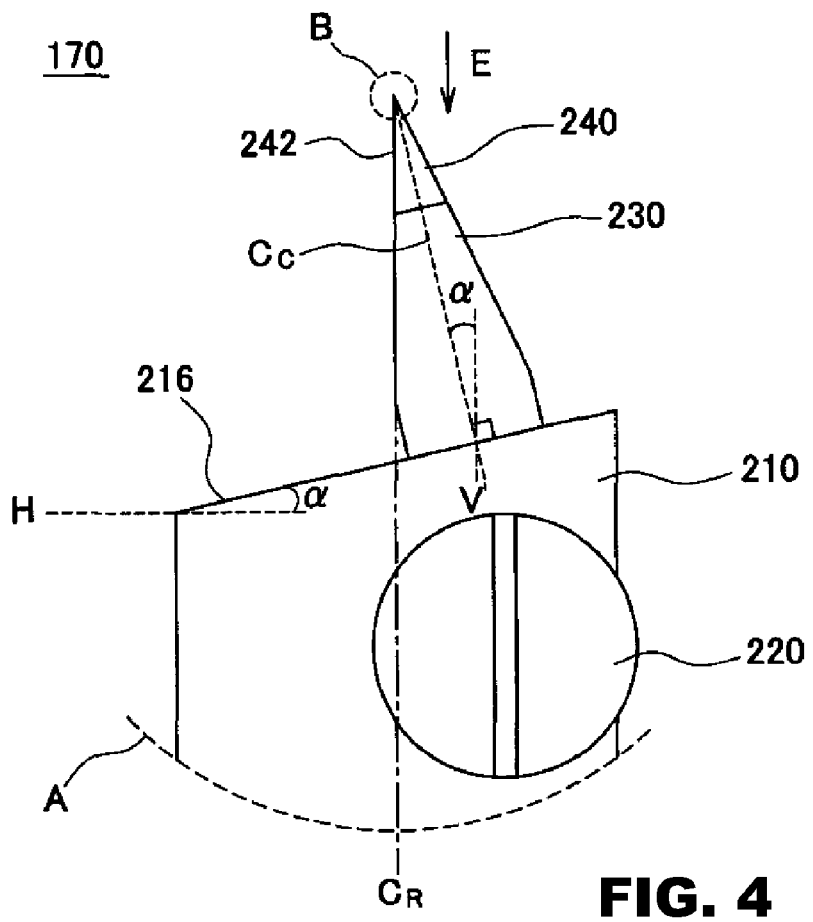
FIG. 4 is a view showing the tip end of the end mill 170 in an enlarged scale.

FIG. 4 is a view showing a tip end portion of the end mill 170 which is surrounded by dotted line A in FIG. 3, in a magnified scale. As shown in FIG. 4, in this end mill 170, one edge portion of the blade body 240 is placed parallel to the rotation axis $C_R$ of the shank 210 to form a cutting edge 242. Accordingly, the center line $C_C$ of the blade body 240, which is seen as an isosceles triangle in FIG. 4, tilts at a tilt angle of α to the vertical line V. The center line $C_C$ of the blade body 240 is placed perpendicularly to the end face 216. Accordingly, the end face 216 of the shank 210 tilts at a tilt angle of α to the horizontal plane H. It should be noted that though the cutting edge 242 appears to coincide with the rotation axis $C_R$ of the shank 210 in FIG. 4, there is a slight gap therebetween.

Figure 5:
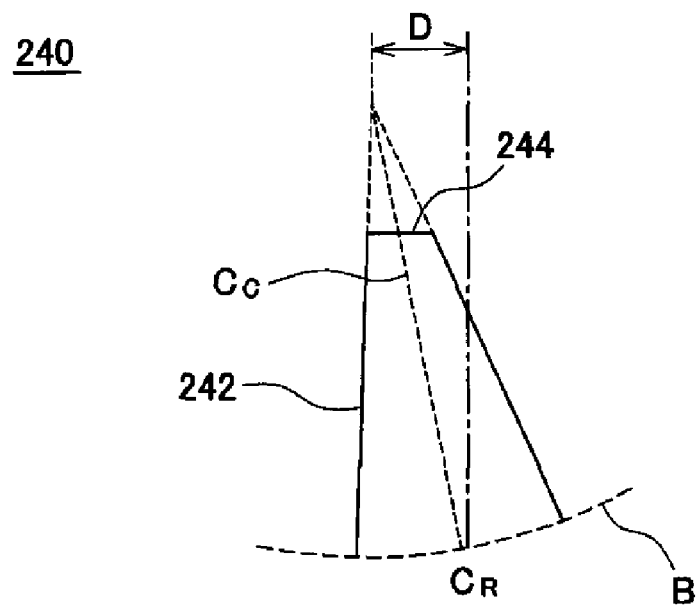
FIG. 5 is a view showing the tip end of the blade body 240 in an enlarged scale.

FIG. 5 is a view showing the vicinity of the tip end of the blade body 240 which is surrounded by dotted line B in FIG. 4, in an enlarged scale. As shown in FIG. 5, the cutting edge 242, which is one edge of the blade body 240, is placed parallel to and at a distance of D from the rotation axis $C_R$ of the shank 210. At the top end of the blade body 240, a horizontal edge as an end cutting edge 244 is formed to adjoin the cutting edge 242. Accordingly, the center line $C_C$ as the overall shape of the blade body 240 regarded as an isosceles triangle intersects the rotation axis $C_R$ of the shank 210 as indicated by dotted lines. When the end mill 170 rotates about the rotation axis $C_R$, the cutting edge 242 draws a circle (cylinder) having a radius equal to the distance D. Accordingly, by pressing the tip end of the end mill 170 against the workpiece in a state in which they are in contact with each other, the end cutting edge 244 is stuck in the workpiece.

It should be noted that the end cutting edge 244 is provided to be displaced from the rotation axis $C_R$ to one side (left side in FIG. 5), and that the end cutting edge 244 does not exist on the rotation axis $C_R$. Accordingly, the entire end cutting edge 244 is involved in machining during the rotation of the end mill 170, and therefore the amount of machining by each portion of the end cutting edge 244 becomes small. Thus, the durability of the end cutting edge 244 is improved, and properties of a machined surface of the workpiece also become favorable.

Figure 6:
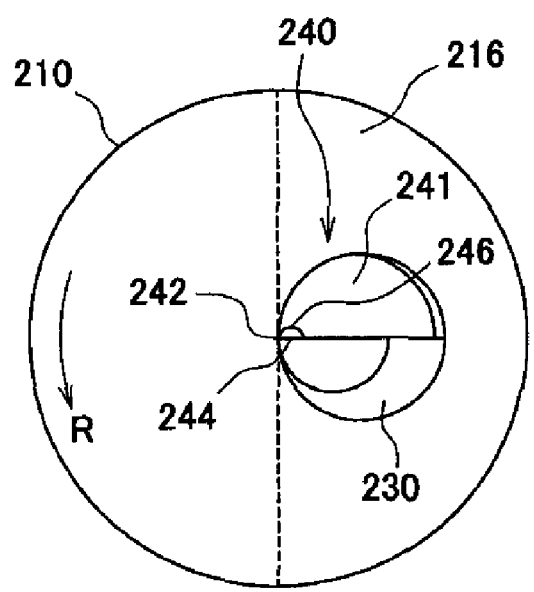
FIG. 6 is a view showing the end mill 170 as seen from the direction of the tip end of the blade body 240.

FIG. 6 is a view showing the end mill 170 as seen from the direction of the tip end of the blade body 240, as indicated by arrow E in FIG. 4. As shown in FIG. 6, each of portions of the blade body 240 and the tip 230 in the vicinities of upper end portions thereof has the same shape as a portion of a circular cone, and is shaped like a half cone having a horizontal semicircular cross section obtained by cutting the circular cone along the central axis thereof. In the blade body 240, the cutting edge 242 is formed on a line of intersection between the curved surface of the circular cone and the cut surface.

This end mill 170 rotates about the rotation axis $C_R$ in the direction indicated by arrow R shown in FIG. 6. Accordingly, for the cutting edge 242, the cut surface of the circular cone serves as a rake-face-side surface. On the other hand, the surface corresponding to the curved surface of the circular cone is a flank-side surface which includes a cutting edge flank 241 for the cutting edge 242. Accordingly, when the end mill 170 moves in a lateral direction in a state in which the tip end of the blade body 240 is stuck in the workpiece, the cutting edge 242 cuts a portion of the workpiece which is in front of the cutting edge 242 in the direction of movement.

The use of the above-described end mill 170 makes it possible to machine a fine rectangular groove having a width of approximately several tens of μm with relatively simple equipment. Moreover, since the blade body 240 of the end mill 170 has high strength, tooling materials such as copper and nickel in addition to functional materials such as resin and glass can also be machined. Accordingly, it is also possible to manufacture an optical waveguide having a fine structure or a die having a rectangular groove for producing a micro reactor or the like.

Figure 7:
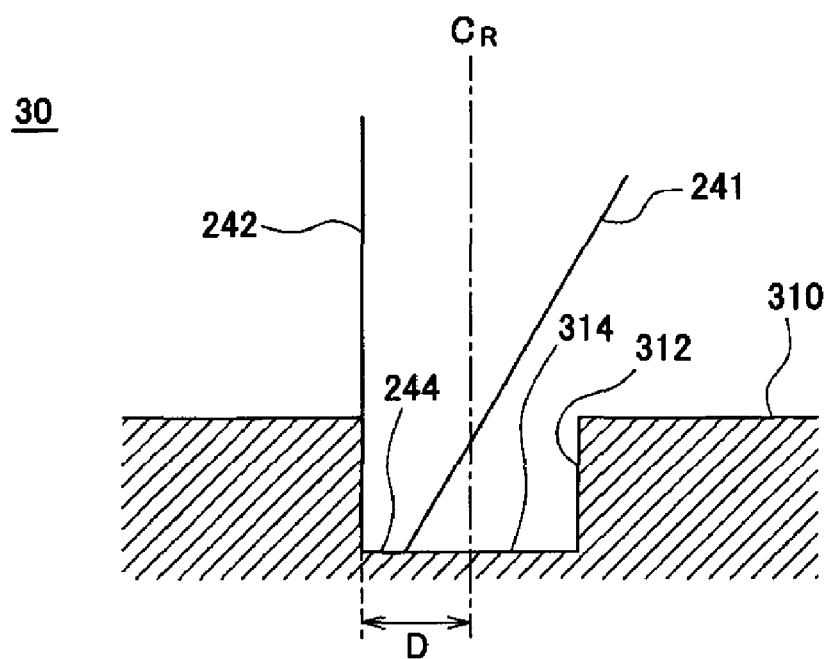
FIG. 7 is a view schematically showing a situation in which the blade body 240 is in contact with a workpiece 30.

FIG. 7 is a view schematically showing a situation in which the blade body 240 of the end mill 170 is stuck in the workpiece 30. As shown in FIG. 7, in the blade body 240 whose tip end is stuck in the workpiece 30 from a machined surface 310 thereof, the end cutting edge 244 forms a bottom surface 314 while being stuck in the workpiece 30. Moreover, the cutting edge 242 forms side walls 312. Accordingly, the distance between the pair of side walls 312 formed by this machining becomes twice the distance D between the rotation axis $C_R$ of the end mill 170 and the cutting edge 242. Thus, the end mill 170 forms a groove having the shape of a doughnut, when it is seen from the upper surface of the workpiece 30, and having a flat bottom surface.

Figure 8:
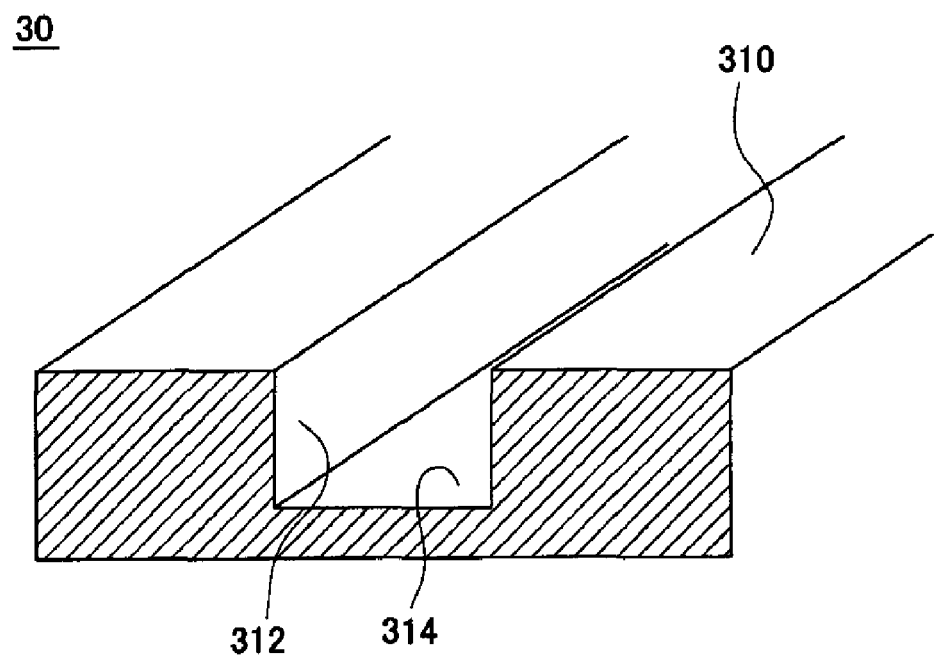
FIG. 8 is a view showing the shape of a rectangular groove formed by the end mill 170.

FIG. 8 is a view showing the shape of a rectangular groove which can be formed using the end mill 170. As shown in FIG. 7, by moving the workpiece 30 in a state in which the tip end of the blade body 240 is stuck in the workpiece 30, a rectangular groove having the bottom surface 314 and the pair of side walls 312 is formed in the workpiece 30. At this time, as apparent from the cross-sectional view shown in FIG. 7, the bottom surface 314 of the rectangular groove is parallel to the machined surface 310. Moreover, each of the side walls 312 of the rectangular groove is perpendicular to the machined surface 310.

It should be noted that in the case where a product made using the end mill 170 is a die, a rectangular groove is formed in which the opening side is slightly wider so that a molded product can be removed. Accordingly, in that case, the cutting edge 242 is also formed to be slightly tilted.

Figure 9:
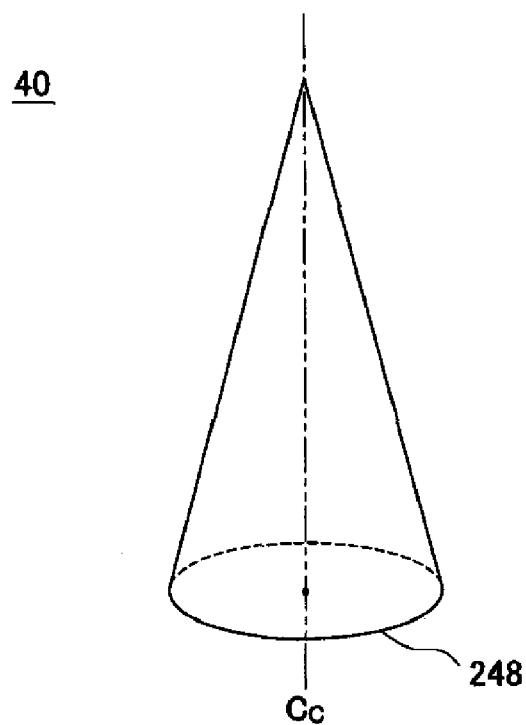
FIG. 9 is a view showing the shape of a blade material 40 in a process for fabricating the blade body 240.

FIG. 9 is a view showing one example of an embodiment of a process for fabricating the blade body 240. As shown in FIG. 9, a conical blade material 40, which is formed around the central axis $C_C$ and which has a circular bottom surface 248, is used as a material for the blade body 240. Such a blade material 40 can be prepared by cutting a round bar made of diamond, boron nitride, aluminum nitride, silicon nitride, alumina, tungsten carbide, or the like to an appropriate length and then rotationally grinding it. It should be noted that these materials have extremely high hardness and can therefore be used to machine hard materials including metals.

Figure 10:
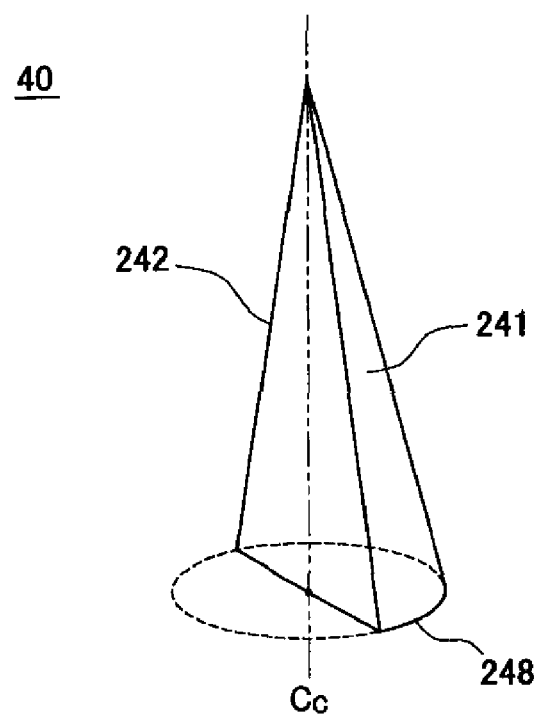
FIG. 10 is a view showing the shape of the blade material 40 in the next step of the process for fabricating the blade body 240.

FIG. 10 is a view showing the shape of the blade material 40 in the next step of the process for fabricating the blade body 240. As shown in FIG. 10, in the blade material 40 which originally has had a conical shape, a flat surface containing the central axis $C_C$ is formed so that the bottom surface 248 of the blade material 40 becomes a semicircular shape. This flat surface can be formed by grinding. Thus, a ridge which ultimately serves as the cutting edge 242 is formed at an end portion of the curved surface of the conical shape. Moreover, the remaining portion of the curved surface of the conical shape serves as the cutting edge flank 241 for the cutting edge 242.

It should be noted that though the face serving as a rake face is a flat face parallel to the rotation axis in this embodiment, this face may be a curved surface or a tilted face which becomes closer to the curved surface and more distant from the rotation axis as the distance from the bottom surface of the conical shape decreases. For example, in the case where the curved surface is formed, a sharper cutting edge 242 can be formed by using a tool having a cylindrical grinding surface and performing grinding in a state in which the ridge serving as the cutting edge 242 and the rotation axis of the grinding tool are parallel to each other. Alternatively, using a grinding tool having a conical grinding surface, the blade body 240 having the sharp cutting edge 242 and a symmetric shape can be formed by performing grinding in a state in which the central axis $C_C$ of the blade material 40 and the rotation axis of the grinding tool are parallel to each other.

Figure 11:
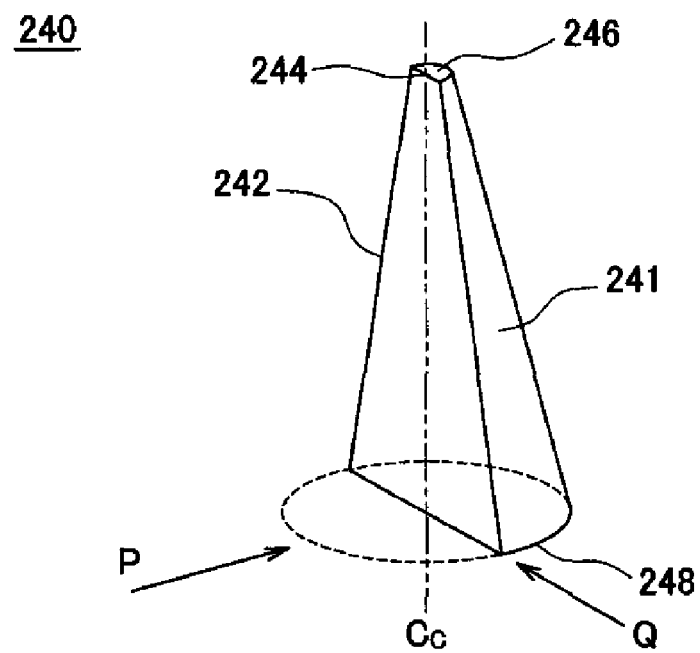
FIG. 11 is a view showing the shape of the blade material 40 formed into the blade body 240.

FIG. 11 is a perspective view showing the shape of the blade body 240 prepared by further performing the next step on the blade material 40 shown in FIG. 10. As shown in FIG. 11, the blade body 240 is the blade material 40 shown in FIG. 10 in which the end cutting edge 244 and a flat surface serving as an end cutting edge flank 246 are formed in the tip end thereof. This flat surface serving as the end cutting edge flank 246 is formed by grinding the tip end of the blade material 40 using a grinding tool having a flat grinding surface.

Figure 12:
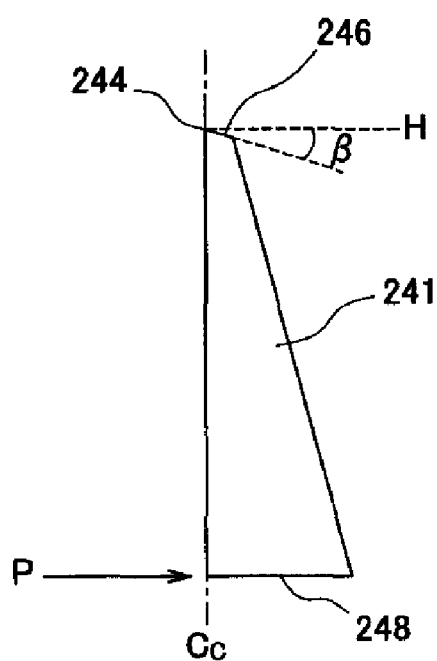
FIG. 12 is a view showing the shape of an end cutting edge flank 246 for an end cutting edge 244 of the blade body 240.

FIG. 12 is a side view showing the blade body 240 as seen from the direction of arrow Q shown in FIG. 11, and particularly showing the placement of the end cutting edge flank 246 in the blade body 240. As shown in FIG. 12, the end cutting edge flank 246 is formed to have the end cutting edge 244 as one edge thereof and be tilted at a relief angle of β. This makes it possible to stick the end cutting edge 244 in the workpiece 30 and machine the workpiece 30.

Figure 13:
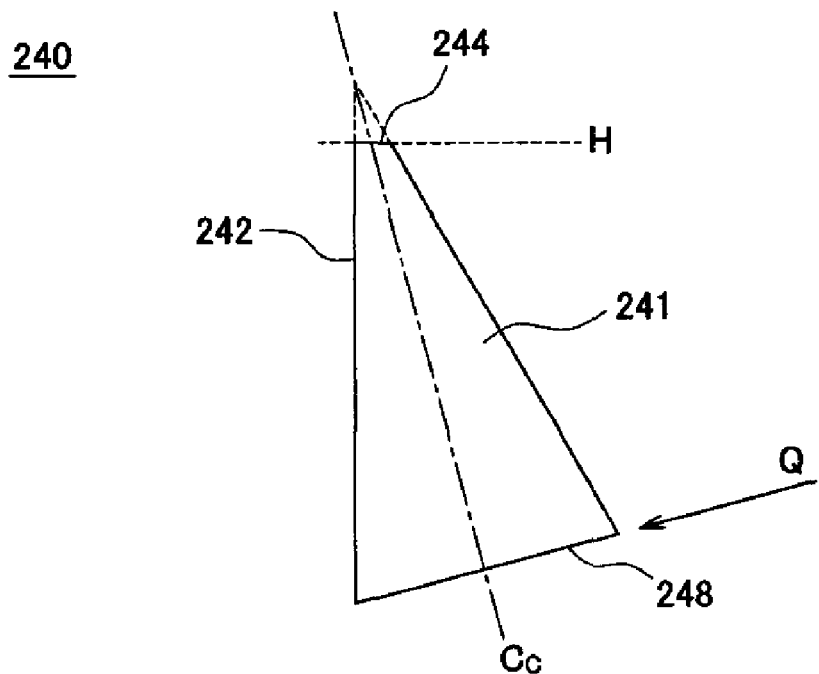
FIG. 13 is a view showing the placement of the end cutting edge 244 in the blade body 240.

FIG. 13 is a side view showing the blade body 240 as seen from the direction of arrow P shown in FIG. 11. It should be noted that in FIG. 13, the cutting edge 242 is drawn to be vertical. As shown in FIG. 13, in the blade body 240, the end cutting edge 244 is formed so that the end cutting edge 244 becomes horizontal as indicated by the horizontal line H in FIG. 13 when the cutting edge 242 is placed vertically. Accordingly, the cutting edge 242 and the end cutting edge 244 form a right angle to each other. This makes it possible to machine a rectangular groove in which the bottom surface 314 and the side walls 312 are perpendicular to each other.

Figure 14:
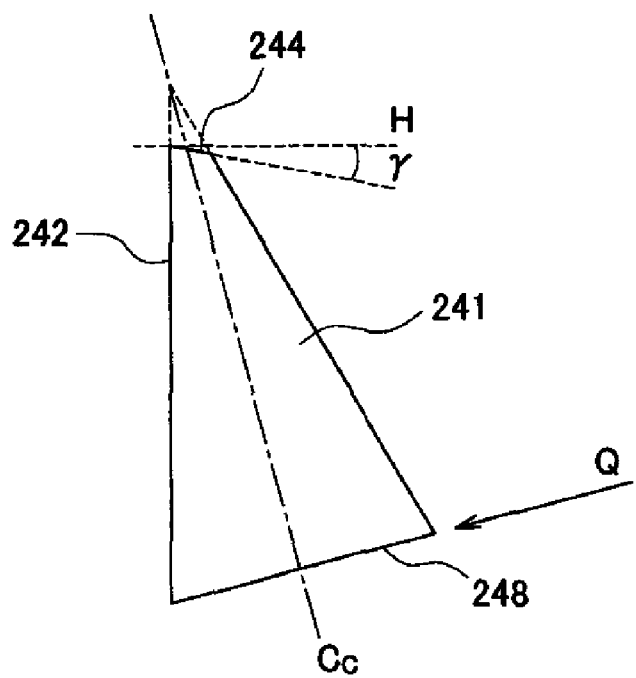
FIG. 14 is a view showing another placement of the end cutting edge 244 in the blade body 240.

FIG. 14 is a view showing another placement of the end cutting edge 244 in the blade body 240. As shown in FIG. 14, in this embodiment, the end cutting edge 244 is at an angle smaller than a right angle to the cutting edge 242, and has an angle of γ to the horizontal line H. That is, the end cutting edge 244 is formed to be tilted so that it is more protruded in the direction toward the tip end thereof as the distance from the cutting edge 242 decreases. This makes the amount of machining large at the tip end of the end cutting edge 244, and therefore machining speed when the end mill 170 is stuck in the workpiece 30 becomes high. Moreover, since what is involved in machining is a tip end portion of the end cutting edge 244 in the cutting edge 242 side, an extension line of the rotation axis $C_R$ of the end mill 170 can be placed to pass between one end of the end cutting edge 244 and the other end thereof. Accordingly, a groove having a narrow width can be machined by further reducing the distance D between the cutting edge 242 and the rotation axis $C_R$.

Figure 15:
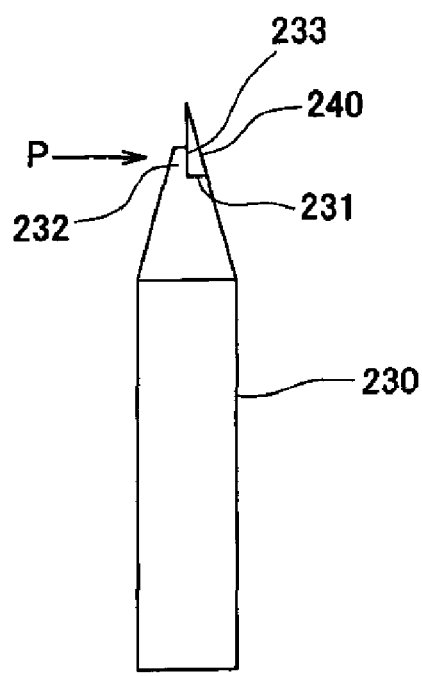
FIG. 15 is a view showing the blade body 240 having a tip 230 attached thereto.

FIG. 15 is a side view showing a composite body 270 formed by bonding the blade body 240 to the tip 230 in which the blade body 240 is seen from the direction of arrow Q in FIG. 11. As shown in FIG. 15, in the vicinity of the tip end of the tip 230, a horizontal bonding surface 231 and a vertical bonding surface 233 are formed. The bottom surface 248 of the blade body 240 and part of the rake-face-side surface thereof are respectively bonded to the bonding surfaces 231 and 233 by, for example, brazing. Thus, bonding is performed over wide areas, and sufficient bonding strength is therefore obtained. Moreover, since an extended portion 232 of the tip 230 which forms the vertical bonding surface 233 is attached to the blade body 240 from the side, the bending strength of the blade body 240 is supplemented.

In the composite body 270 of the blade body 240 and the tip 230 which has the above-described shape and structure, the blade body 240 has such a shape that the horizontal cross-sectional shape changes continuously overall. Accordingly, reaction forces which the cutting edge 242 and the end cutting edge 244 are subjected to during machining can be three-dimensionally dispersed overall to prevent the occurrence of stress concentration in a particular portion. Thus, the practical bending strength of the blade body 240 becomes high.

Figure 16:
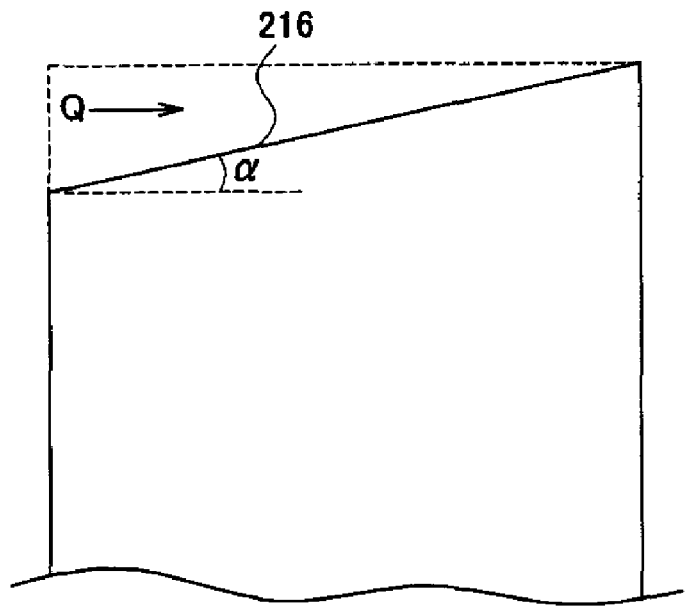
FIG. 16 is a view showing the form of an end face 216 of a shank 210 in the process of manufacture thereof.

FIG. 16 is a side view showing the shape of the shank 210, to which the composite body 270 of the blade body 240 and the tip 230 as described above is attached, in the vicinity of the end face 216 in the process for manufacturing the shank 210. As shown in FIG. 16, in the manufacture of the shank 210, the tilted end face 216 having a tilt angle of α is formed at an end portion of a round bar originally having a horizontal end face. It should be noted that in FIG. 16, the orientation of the blade body 240 when the composite body 270 is attached to the shank 210 later is indicated by arrow Q shown in FIG. 11 for reference.

Figure 17:
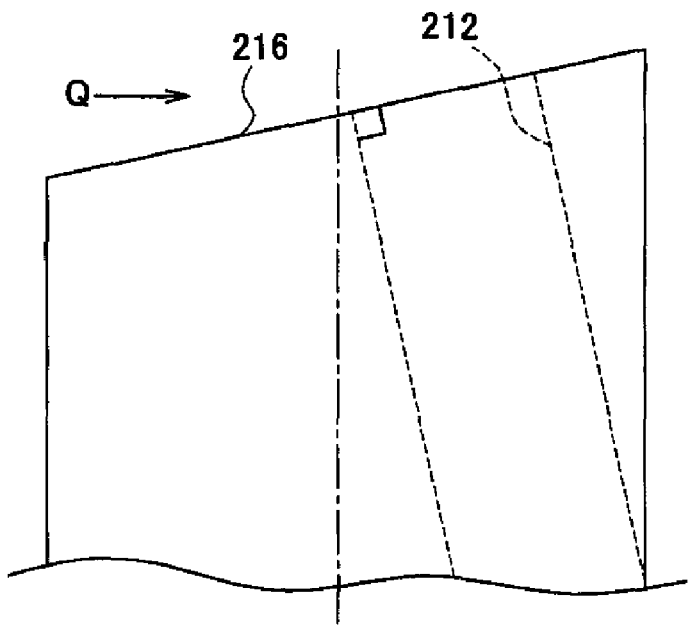
FIG. 17 is a view showing the form of an attachment hole 212 in the process of manufacture of the shank 210.

FIG. 17 is a view showing a hole-making process performed on the shank 210 in the next step of the manufacturing process. As shown in FIG. 17, the attachment hole 212 is formed in an end portion of the shank 210 by perpendicularly sticking a tool in the tilted end face 216. Since the end face 216 is tilted at a tilt angle of α as described previously, the attachment hole 212 is formed to be tilted at an angle complementary to the tilt angle α to the horizontal plane. It should be noted that in this hole-making process, a hole-making tool is perpendicularly touched to and stuck in the end face 216. Accordingly, a machining position and a machining angle do not fluctuate, and the attachment hole 212 is accurately formed.

Figure 18:
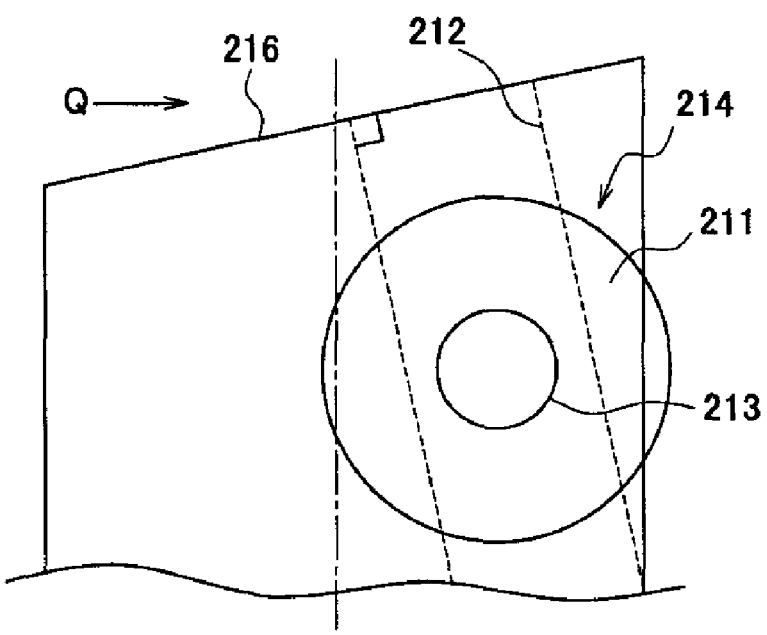
FIG. 18 is a view showing the form of a threaded hole 214 in the process of manufacture of the shank 210.

FIG. 18 is a view showing a process for making a threaded hole 214 in the shank 210 in the next step of the manufacturing process. As shown in FIG. 18, the threaded hole 214 has a shape obtained by combining a female screw 213 threaded and a spot facing 211 to which a head portion of the screw 220 screwed therein is tightly attached. The female screw 213 is formed perpendicularly to the attachment hole 212. Accordingly, if the screw 220 is screwed in place in a state in which the composite body 270 is inserted in the attachment hole 212, the composite body 270 is perpendicularly pressed against the inner wall of the attachment hole 212, and therefore the attachment position is not displaced in the longitudinal direction of the composite body 270. Moreover, both the attachment hole 212 and the composite body 270 have circular cross-sectional shapes. Accordingly, even if the diameters of the two differ from each other, the attachment angle of the composite body 270 is automatically matched to the tilt angle of the attachment hole 212 by the composite body 270 being pressed against the inner wall of the attachment hole 212. Moreover, the composite body 270 can be easily changed by loosening the screw 220.

Figure 19:
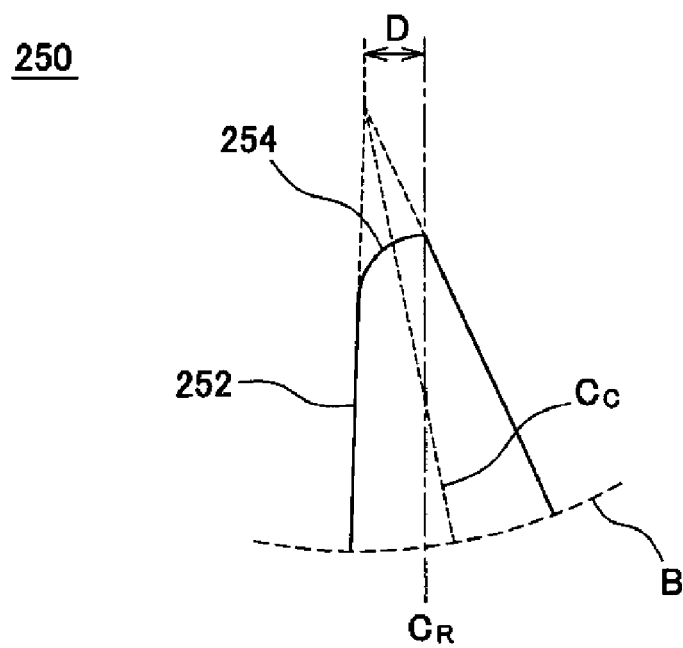
FIG. 19 is a view in which another embodiment of the end mill 170 is shown using the shape of the tip end of a blade body 250.

FIG. 19 is a view in which another embodiment of the end mill 170 is shown using the shape of the tip end of a blade body 250 and which corresponds to the vicinity of the tip end of the blade body 240 surrounded by dotted line B in FIG. 4. As shown in FIG. 19, a linear cutting edge 252, which is one edge of the blade body 250, is placed parallel to and at a distance of D from the rotation axis $C_R$ of the shank 210. At the top end of the blade body 250, a quadrant-shaped end cutting edge 254 is formed whose one end adjoins the cutting edge 252. Here, the other end of the end cutting edge 254 extends to the intersection with the rotation axis $C_R$. At this endpoint, the tangent to the end cutting edge 254 becomes horizontal.

When the end mill 170 provided with the blade body 250 as described above rotates about the rotation axis $C_R$, the cutting edge 252 draws a circle (cylinder) having a radius equal to the distance D. Moreover, by pressing the tip end of the end mill 170 against a workpiece in a state in which they are in contact with each other, the end cutting edge 254 is stuck in the workpiece. Moreover, since the arc-shaped end cutting edge 254 rotates to form a hole or a groove in the workpiece, the bottom surface of the hole or the groove has a semicircular cross-sectional shape. The end cutting edge 254 having such a shape can be made by grinding the tip end of the blade material 40 shown in FIG. 10 using a rotary grinding tool whose inner surface has a semisphere grinding surface and which rotates about the center of the grinding surface, a disk-shaped rotary tool in which the peripheral surface thereof has a groove having a semicircular cross section, or the like.

Figure 20:
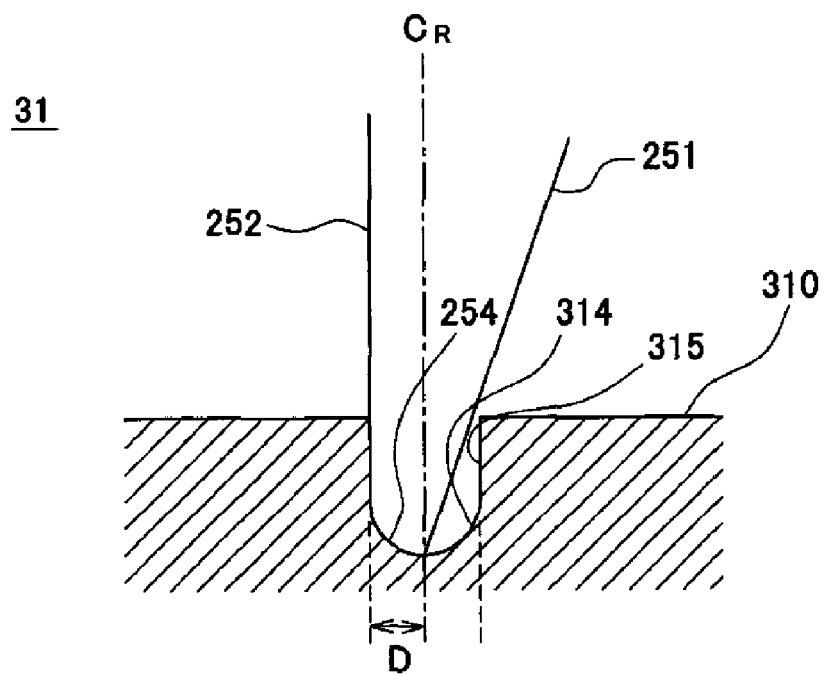
FIG. 20 is a view schematically showing a situation in which the blade body 250 is stuck in a workpiece 31.

FIG. 20 is a view schematically showing a situation in which the blade body 250 of the end mill 170 is stuck in a workpiece 31. As shown in FIG. 20, in the blade body 250 of which tip end is stuck in the workpiece 31 from a machined surface 310 thereof, the end cutting edge 254 forms a bottom surface 314 having a semicircular cross-sectional shape while sticking in the workpiece 31. The cutting edge 252 forms side walls 312 perpendicular to the machined surface of the workpiece 31. It should be noted that though the tip end of the end cutting edge 254 ends at the rotation axis $C_R$ because FIG. 20 is a schematic view, the end cutting edge 254 is preferably extended beyond the rotation axis $C_R$ in order to smooth the bottom surface of the groove. In that case, the shape of the end cutting edge 254 is an arc larger than a quarter of a circle.

Figure 21:
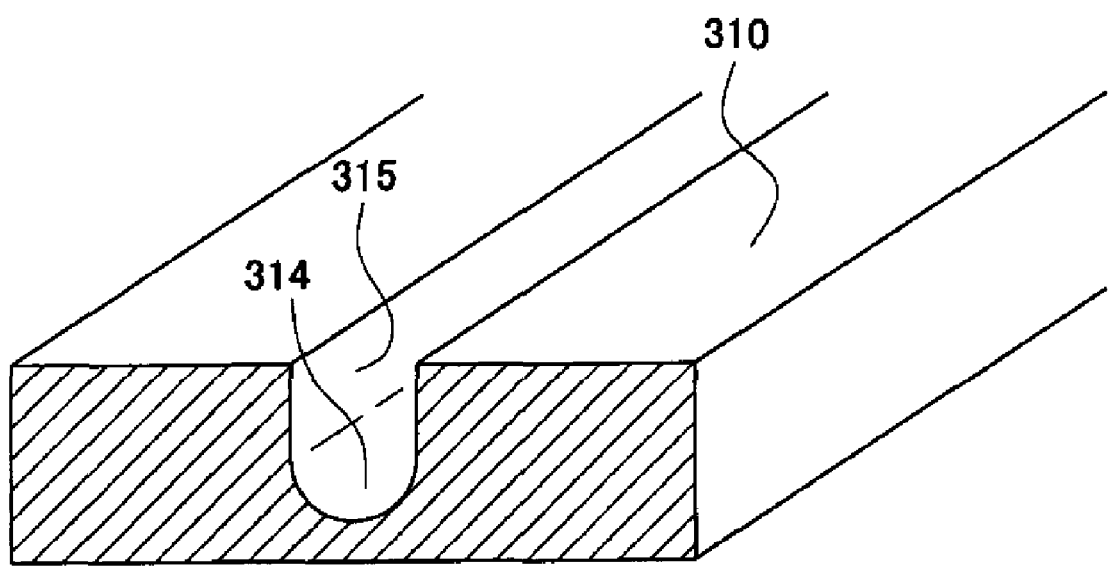
FIG. 21 is a view showing the shape of a groove formed by the end mill 170.

FIG. 21 is a view showing the shape of a groove formed by the end mill 170 having the blade body 250 shown in FIG. 19. When the workpiece 31 is moved in a state in which the tip end of the blade body 250 is stuck in the workpiece 31 as shown in FIG. 20, a groove having the bottom surface 314 and the pair of side walls 312 is formed in the workpiece 31. At this time, as apparent from the cross-sectional view shown in FIG. 20, the bottom surface 314 of the groove has a semicircular cross-sectional shape. In addition, each of the side walls 312 of the groove is perpendicular to the machined surface 310.

It should be noted that in the case where a product made using this end mill 170 is a die, a groove is formed in which the opening side is slightly wider so that a formed product can be removed. Accordingly, in that case, the cutting edge 252 is also formed to be slightly tilted.

As described above, according to this embodiment, since the cutting edge 242 or 254 parallel to the rotation axis is provided, a rectangular groove can be machined which has side walls perpendicular to the surface of an object of machining. Moreover, the blade body 240 or 250 has a cross-sectional area which becomes larger as the distance from the shank 210 decreases and the change of the cross-sectional area is continuous. Accordingly, reaction forces from the cutting edge 242 during machining are dispersed over the entire blade body 240 or 250, and stress concentration does not occur in a particular portion. Thus, high strength against breakage is provided, and high-hardness materials such as tooling materials can also be machined.

Although the present invention has been described above using embodiments, the technical scope of the present invention is not limited to the scope of the description of the embodiment. It is apparent to those skilled in the art that various modifications and improvements can be made to the above-described embodiments. It is apparent from the description of the scope of claims that embodiments in which such modifications and improvements are made can also be included in the technical scope of the present invention.

Although the preferred embodiments of the present invention have been described in detail, it should be understood that various changes, substitutions and alterations can be made therein without departing from spirit and scope of the inventions as defined by the appended claims.

What is claimed is:

1. An end mill comprising:
    a shank having one end gripped by a spindle, the shank being rotatable about a predetermined rotation axis; and
    a blade body held at the other end of the shank, the blade body being rotatable together with the shank,
    wherein the blade body has a shape in which an area of a cross section in a plane perpendicular to the rotation axis decreases as distance from the shank increases, and the blade body includes a linear cutting edge parallel to the rotation axis at a certain distance from the rotation axis, wherein the blade body includes a conical surface portion and a flat surface portion that intersect to form the linear cutting edge, and wherein an angle of the blade body with respect to the shank is nonvariable.

2. The end mill according to claim 1, wherein the blade body includes an end cutting edge adjoining the linear cutting edge.

3. The end mill according to claim 2, wherein the end cutting edge is formed at a right angle to the linear cutting edge, and is disposed to be displaced from the rotation axis to one side.

4. The end mill according to claim 2, wherein the end cutting edge is obliquely disposed relative to the linear cutting edge.

5. The end mill according to claim 1, wherein the conical surface portion is a flank-side surface of the blade body, and wherein the flat surface portion is a rake-face-side surface adjoining the flank-side surface in two portions,
    and wherein the linear cutting edge is formed in one of the two portions in which the flank-side surface and the rake-face-side surface come in contact with each other.

6. The end mill according to claim 5, wherein a central axis of the cone and the rotation axis of the shank intersect each other.

7. The end mill according to claim 5, wherein the cone is a circular cone, and the rake-face-side surface is parallel to a central axis of the circular cone.

8. The end mill according to claim 5, wherein the rake-face-side surface adjoins an end cutting edge of the blade body.

9. The end mill according to claim 5, wherein the rake-face-side surface is formed by grinding a flat surface using a tool having any one of a conical grinding surface and a cylindrical grinding surface.

10. The end mill according to claim 1, wherein the other end of the shank has an end face tilting to the rotation axis and an attachment hole formed perpendicularly to the end face, and the blade body is supported by one end of a tip, the other end of the tip being inserted in the attachment hole.

11. The end mill according to claim 10, wherein the attachment hole is a straight hole formed by perpendicularly sticking a tool in the end face after forming the end face tilting to the rotation axis.

12. The end mill according to claim 11, wherein:
    the shank has a threaded hole formed perpendicularly to the attachment hole from a surface thereof, and
    the tip is fixed in place by a screw screwed in the threaded hole.

13. The end mill according to claim 10, wherein the tip has a bonding surface bonded to an entire bottom surface of the blade body.

14. The end mill according to claim 10, wherein the tip has a bonding surface bonded to the blade body, the bonding surface including a bonding surface bonded to part of a rake-face-side surface of the blade body.

15. A milling apparatus comprising:
- a spindle head for supporting a rotatable spindle; and
- an end mill gripped by the spindle and rotatable about a predetermined rotation axis, wherein the end mill comprises:
  - a shank having one end gripped by the spindle; and
  - a blade body having a shape in which an area of a cross section in a plane perpendicular to the rotation axis decreases as distance from the shank increases, including a linear cutting edge parallel to the rotation axis at a certain distance from the rotation axis, and being held at the other end of the shank to be rotatable together with the shank, wherein the blade body includes a conical surface portion and a flat surface portion that intersect to form the linear cutting edge, and wherein an angle of the blade body with respect to the shank is nonvariable.

* * * * *